United States Patent [19]

Suslin et al.

[11] 4,137,143
[45] Jan. 30, 1979

[54] APPARATUS FOR ELECTROCHEMICAL MACHINING OF METAL PARTS

[75] Inventors: Vladimir I. Suslin; Boris A. Makeev; Alexandr I. Dubovik; Zinovy A. Lekarev; Vitaly A. Pilipenko; Alexandr I. Etnaer; Anatoly A. Kolesnichenko; Pavel S. Razdymakha, all of Kharkov, U.S.S.R.

[73] Assignee: Nauchno-Issledovatelsky Institut Avtomatizatsii Upravlenia I Proizvodstva Niiap, U.S.S.R.

[21] Appl. No.: 860,373

[22] Filed: Dec. 14, 1977

[51] Int. Cl.² .......................... B23P 1/02; B23P 1/12
[52] U.S. Cl. ............................. 204/224 M; 204/225; 204/228
[58] Field of Search .................. 204/224 M, 228, 225, 204/129.1

[56] References Cited

U.S. PATENT DOCUMENTS

| 3,386,907 | 6/1968 | Abt | 204/224 M |
| 3,448,024 | 6/1969 | Philpott | 204/224 M X |

FOREIGN PATENT DOCUMENTS

| 4625967 | 7/1971 | Japan | 204/224 M |

Primary Examiner—John H. Mack
Assistant Examiner—D. R. Valentine
Attorney, Agent, or Firm—Robert E. Burns; Emmanuel J. Lobato; Bruce L. Adams

[57] ABSTRACT

Apparatus for electrochemically machining metal workpieces. An electrically conductive stationary support supports a metal workpiece to be electrochemically machined. An electrically conductive mobile support supports an electrode-tool and moves it toward the workpiece for machining and retracts it. A pair of electrical contacts are electrically connected to the stationary and mobile supports respectively. One of the contacts is mobile and moves with the mobile support axially through the other contact which is stationary. A given axial length of the mobile contact is non-conductive. This length can be determined to allow for the height of the workpieces machined. The non-conductive portion insures that the mobile contact is continuously guided on the stationary contact during its axial movement and that the contacts are in continuous slidable contact. A stop on the mobile contact variably positionable axially thereon closes a supply circuit energizing the two contacts and the supports as the electrode-tool assumes its desired initial position for machining and the circuit is opened when the electrode-tool is retracted.

3 Claims, 1 Drawing Figure

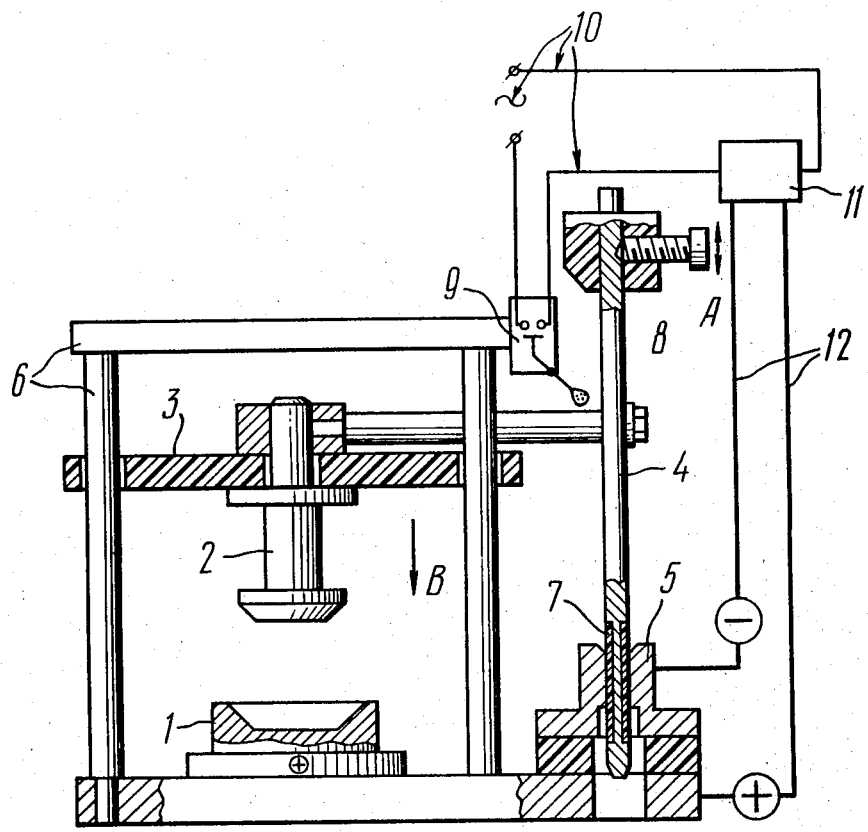

APPARATUS FOR ELECTROCHEMICAL MACHINING OF METAL PARTS

FIELD OF APPLICATION OF THE PRESENT INVENTION

The invention relates to electric machining methods, and, more particularly, to apparatus for electrochemical machining of metal parts.

BACKGROUND OF THE INVENTION

There is known an apparatus for electrochemical machining of metal parts, (cf. Inventor's Certificate No. 462,690 CL B23P 1/04 granted in the USSR)

The known apparatus comprises an electrode-tool, mounted on a component part of the apparatus mobile in the direction of the working feed, and a contact system formed with a pair of detachable contacts for connection to a process current circuit. One of said contacts is mounted on the mobile component part, and the other, on a stationary component part of the apparatus.

The ratio of the lengths of the mating sections of both contacts is such as to allow closing the process current circuit throughout the range of heights of parts being machined and to open the circuit when the electrode-tool is backed away.

Reliable both making and breaking of the process current circuit of the apparatus are obtained by accurate manufacture of the contacts coupled to their large size and adequate stiffness.

This results in an excessive consumption of metal and higher costs while providing no guarantee of accurate mating of contacts whose shafts may shift one with respect to another due to vibrations in service. The contact systems suffer from a rapid wear and burning of contacts, these disadvantages affecting adversely the service reliability of the apparatus as a whole.

In addition, the beginning of the electrochemical machining fails to agree with the required optimum spacing of the electrode-tool and of a part being machined so that the resultant machined configuration is blurred, and the accuracy of machining, impaired.

SUMMARY OF THE INVENTION

It is an object of the present invention to improve the service reliability of the apparatus.

Another object of the invention is to improve the quality of machining of metal parts.

The above and other objects are attained by providing an apparatus for electrochemical machining of metal parts by an electrode-tool mounted on a component part of the apparatus mobile in the direction of the feed and comprising a contact system formed by a pair of contacts for connection to a process current circuit, in accordance with the invention, the pair of contacts is mating, one of said contacts being attached to a mobile component part of the apparatus carrying an electrode-tool, and the other contact, to a stationary component part of the apparatus, at least one of the contacts having a guide of a non-conducting material whose length is selected so as to provide a mechanical connection between the contacts after the electric circuit is opened when the electrode-tool is returned into a non-working position. The ratio of the length of the guide to those of the contacts is such as to close the process current circuit throughout the range of the heights of parts being machined and to open said circuit when the electrode-tool is backed away.

It is expedient to provide the apparatus with a stop and a limit switch both slidably mounted for adjustment on the mobile and the stationary component parts of said apparatus.

The invention enhances the reliability of operation of the apparatus and the quality of electrochemical machining of metal parts.

BRIEF DESCRIPTION OF THE DRAWING

These and other objects and features of the invention become readily apparent from one embodiment thereof which will now be described by way of example with reference to the accompanying drawing, which is a schematic diagram of a longitudinal cross section of an apparatus for electrochemical machining of metal parts, according to the invention.

DESCRIPTION OF THE PREFERRED EMBODIMENT

The drawing illustrates an apparatus for electrochemical machining of metal parts 1 by an electrode-tool 2 mounted on a mobile component part 3 of the apparatus.

The apparatus comprises a contact system formed by a pair of contacts 4 and 5 for connection to a process current circuit. The contact 4 is a travelling or movable contact fixed to the mobile component part of the apparatus, and the contact 5, is fixed to a stationary component part 6 of the apparatus.

The mobile contact 4 accommodates a guide 7 of a non-conducting material whose length is selected in a manner to provide a mechanical connection between the contacts after the electric circuit is opened when the electrode-tool 2 is backed into a non-working position, the ratio of the length of the guide 7 to those of the contacts 4 and 5 is such as to allow closing the process current circuit throughout the range of the heights of parts 1 being machined and to open the circuit when the electrode-tool 2 is backed away.

A stop 8 intended to cooperate with a limit switch 9 of a control circuit 10 of a DC source 11 is slidably mounted for variable adjustment axially on the mobile contact 4 for variably adjusting the instant when the process current is to be switched on.

The limit switch 9 is secured to the stationary component part 6 of the apparatus.

The arrow A shows the direction of motion of the adjustable stop 8 when setting it with respect to the mobile contact 4.

A DC source 11 is connected to the contact 5 and to the stationary component part 6 of the apparatus by means of buses 12.

The accompanying drawing illustrates a non-working position of the apparatus. The arrow B shows the direction of approach of the electrode-tool 2 toward a part 1 to be machined.

When the apparatus is idle, the contact 4 is in a topmost position, the guide 7 is connected mechanically with the contact 5 and the process current circuit is open.

The operation of the apparatus begins by moving the electrode-tool 2 toward a part or workpiece 1 as indicated by the arrow B. The contact moves together with the electrode-tool 2, and when the latter comes to the working position, the contact 4 closes the process current circuit.

Until the limit switch 9 is closed, the motion of the stop 8 together with the contact 4 is equal to that of the electrode-tool 2 toward the part or workpiece 1 being machined with the effect that the process current is switched on the instant the electrode-tool 2 comes to the working position, the electrochemical machining of said part 1 then begins should an electrolyte be provided in the working gap between the electrode-tool 2 and said part 1.

The invention enhances the reliability of the apparatus as the contacts 4 and 5 are not disconnected mechanically one from another, improves the quality of electrochemical machining of parts through a perfectly timed closure of the process current circuit, and simplifies and brings down the cost of the apparatus.

What is claimed is:

1. Apparatus for electrochemically machining metal workpieces comprising, an electrically conductive stationary support for supporting a metal workpiece to be electrochemically machined, an electrically conductive mobile support for an electrode-tool and movable toward and away from the workpiece, a pair of electrical contacts for providing electrical current to the stationary support and to the mobile support respectively, one of said contacts constituting a stationary contact and the other a mobile contact continuously slidably guided on the stationary contact during relative movement therebetween as said mobile support moves toward and away from said workpiece, means connecting the mobile contact to the mobile support comprising means establishing electrical connection therebetween and means for effecting proportional travel of the mobile contact jointly with the mobile support, said mobile contact having a non-conductive portion slidable on the stationary contact electrically isolating the two contacts during a certain distance of relative travel therebetween and maintaining the mobile contact guided on the stationary contact as said mobile support is retracted away from the workpiece to retract the electrode tool, a circuit for energizing the pair of contacts, and means on said mobile contact for closing said circuit as said electrode-tool moves toward said workpiece for variably setting the length of travel of the mobile support and electrode-tool thereon toward said workpiece, thereby variably setting when electrical current is applied to the two contacts and the workpiece and the electrode tool.

2. Apparatus for electrochemically machining metal workpieces according to claim 1, in which said mobile contact is slidable axially in said stationary contact.

3. Apparatus for electrochemically machining metal workpieces according to claim 2, in which said non-conductive portion is disposed circumferentially along a given axial length of said mobile contact.

* * * * *